E. C. WILDER.
MOWING MACHINE.
APPLICATION FILED MAR. 18, 1918.

1,279,060.

Patented Sept. 17, 1918.

INVENTOR
Edward C. Wilder

WITNESSES

BY

ATTORNEY

UNITED STATES PATENT OFFICE.

EDWARD C. WILDER, OF CUBA, NEW YORK.

MOWING-MACHINE.

1,279,060.  Specification of Letters Patent.  Patented Sept. 17, 1918.

Application filed March 18, 1918. Serial No. 223,155.

*To all whom it may concern:*

Be it known that I, EDWARD C. WILDER, a citizen of the United States, residing at Cuba, in the county of Allegany and State of New York, have invented certain new and useful Improvements in Mowing-Machines, of which the following is a specification.

This invention relates to front-cut harvesters, and its primary object is to produce a machine of this character which is intended to be pushed forward of and by a tractor and to cut an extra wide swath. It is well known that in the ordinary harvester with a cutting apparatus projecting to one side of the line of draft there is considerable side lash, its extent depending upon the length of the cutter bar and the resistance set up. Moreover the horses or the tractor travel over the grass or grain already cut, which in itself is objectionable. Numerous efforts have been made to overcome these two features, as well as to amplify the capacity of the machine by lengthening its cutter, and perhaps the best solution is found in the front-cut machine where the cutter moves forward of the power. My invention is of this type, and it employs three cutters, all of which may be of considerable length so that in the aggregate some eighteen feet may be cut at a single trip. By my invention I push this machine in advance of the tractor and steer it as it progresses, leaving the tractor to follow it. Also I make provision whereby the wheels of the truck of my machine and the wheels of the tractor will not travel on the cut grass or grain to its detriment.

Figure 1:
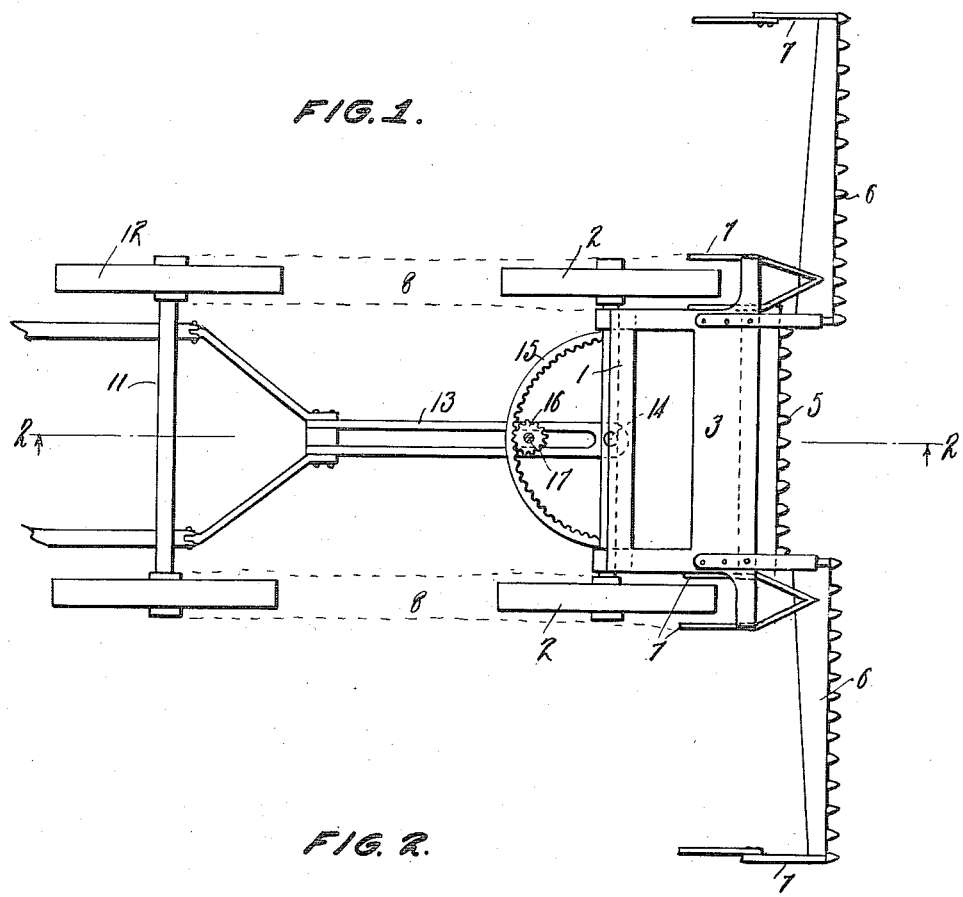

Details are brought out in the following specification, and reference is made to the drawings, wherein:

Figure 1 is a plan view of this machine, and

Figure 2:
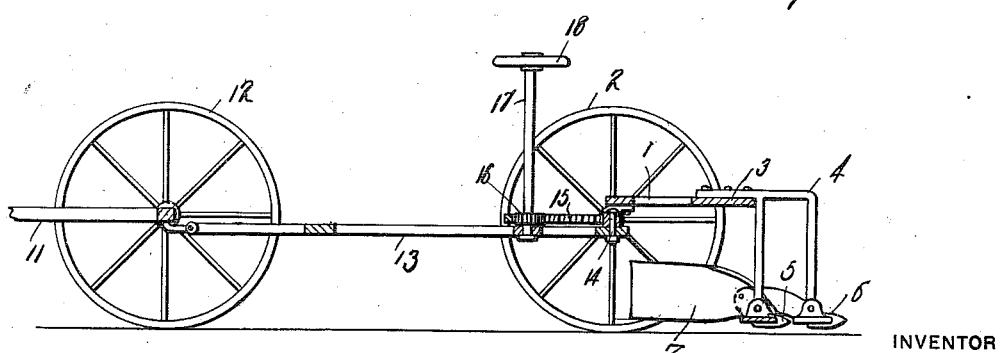

Fig. 2 a longitudinal section on the line 2—2 of Fig. 1.

My invention comprises a frame 1 mounted on a single pair of wheels 2 and having a platform 3 on which one operator may stand or sit, hangers 4 carried by the extremities of this platform, a central cutter 5 supported at its ends by two of said hangers, and two side or lateral cutters 6 supported at their inner ends by the other hangers. The exact details of the manner in which the cutters are supported are not brought out in the drawings as not considered necessary to this specification. The machine has dividers or swath boards 7 which are preferably disposed at the outer ends of all the cutters and near the inner ends of the lateral cutters, and thereby are produced two paths as indicated by the dotted lines at 8 in Fig. 1, within each of which the grain or grass may be left standing if the knives are omitted at the front of these paths or from which the swath boards may push the cut grain so that it is not permitted to fall into the paths. In the latter travel the wheels 2 of the truck 1, as well as the wheels 12 of the tractor indicated broadly at 11. The tongue 13 of this tractor extends forward and is pivoted at 14 to said truck 1, and the latter carries in rear of its axle a toothed sector 15 struck on an arc around the pivot 14. Meshing with its teeth is a gear 16 on the lower end of a steering shaft 17, herein shown as upright and provided with a hand wheel 18 although I do not wish to be limited in this respect. As indicated in the drawings, it is possible an operator on the platform 3 would manipulate the wheel 18 from time to time to properly direct the machine along the course he desires to follow, although if the tongue were provided with another platform, a second operator might stand in rear of the steering wheel and direct the same. I would not be limited to details in this respect as they are unimportant; and it is obvious that other forms of steering mechanism might be employed without departing from the spirit of my invention.

In a machine thus constructed, a tractor 11 of sufficient power is hinged at 14 to the truck 1, and the whole driven to the field where operations are to commence. Here the several cutters are lowered to their proper levels, and with an engineer in charge of the tractor and a pilot in charge of the truck, my improved mowing machine is pushed rather than drawn over the field where the grass or grain is to be cut. It will be obvious that nothing travels in the standing grain, no wheel passes over the cut grain, and the wheels 2 and 12 travel in paths especially made for them. The machine must be so directed by its steering mechanism that it cuts a swath extending accurately along the edge of the swath last cut; and, as there is no side lash, this can be easily done. The drawings are to a large extent diagrammatic, and no means is illustrated for driving the knives within the several cutting apparatus. I leave that question to the manufacturer.

What is claimed as new is:—

1. In a front-cut harvester, the combination with a truck, a pair of wheels supporting the same, a main cutter extending across the front of the truck and lateral cutters projecting respectively beyond the ends of the main cutter, and swath boards carried by the structure and producing paths in which said wheels travel; of a tractor standing in rear of the truck and with its wheels traveling also in said paths, and dirigible connections between the tractor and truck.

2. In a front-cut harvester, the combination with a truck, a pair of wheels supporting the same, a main cutter extending across the front of the truck, two lateral cutters extending from the main cutter outward and in advance thereof, and swath boards carried by said cutters and producing paths in which said wheels travel; of a tractor standing in rear of the truck and with its wheels traveling in said paths, a tongue extending from the front axle of the tractor forward and pivoted at the transverse center of said truck, a toothed sector carried rigidly by said truck and set on a curve around said pivot, a gear engaging the sector, and steering mechanism for manipulating said gear.

In testimony whereof I affix my signature in presence of two witnesses.

EDWARD C. WILDER.

Witnesses:
 EFFIE B. HUNT,
 FRED C. MOORE.